(12) United States Patent
Tanaka

(10) Patent No.: US 12,454,609 B2
(45) Date of Patent: Oct. 28, 2025

(54) POLYETHYLENE POWDER AND MOLDED ARTICLE

(71) Applicant: Asahi Kasei Kabushiki Kaisha, Tokyo (JP)

(72) Inventor: Kenya Tanaka, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 762 days.

(21) Appl. No.: 17/770,085

(22) PCT Filed: Oct. 19, 2020

(86) PCT No.: PCT/JP2020/039215
§ 371 (c)(1),
(2) Date: Apr. 19, 2022

(87) PCT Pub. No.: WO2021/079840
PCT Pub. Date: Apr. 29, 2021

(65) Prior Publication Data
US 2022/0372258 A1 Nov. 24, 2022

(30) Foreign Application Priority Data

Oct. 23, 2019 (JP) ................. 2019-193077

(51) Int. Cl.
*C08L 23/06* (2006.01)
*C08F 10/02* (2006.01)
*C08F 110/02* (2006.01)
*C08J 3/12* (2006.01)
*C08J 9/24* (2006.01)

(52) U.S. Cl.
CPC ............ *C08L 23/06* (2013.01); *C08J 3/12* (2013.01); *C08J 9/24* (2013.01); *C08F 10/02* (2013.01); *C08F 110/02* (2013.01); *C08J 2323/06* (2013.01); *C08L 2203/30* (2013.01); *C08L 2207/068* (2013.01)

(58) Field of Classification Search
CPC ........ C08F 110/02; C08F 10/02; C08L 23/06; C08L 2207/068
See application file for complete search history.

(56) References Cited

U.S. PATENT DOCUMENTS

| 10,544,240 | B2 * | 1/2020 | Tanaka | ........................ C08J 5/18 |
| 10,597,796 | B2 * | 3/2020 | Tanaka | ................. C08F 110/02 |
| 11,976,141 | B2 * | 5/2024 | Tanaka | ........................ C08J 5/18 |
| 2008/0044655 | A1 | 2/2008 | Nakayama et al. | |
| 2015/0344593 | A1 | 12/2015 | Sarma et al. | |
| 2019/0225714 | A1 | 7/2019 | Jarumaneeroj et al. | |
| 2021/0032446 | A1 * | 2/2021 | Tanaka | ................. B29C 43/003 |

FOREIGN PATENT DOCUMENTS

| CN | 108456273 A | 8/2018 |
| JP | S61-174240 A | 8/1986 |
| JP | H01-317163 A | 12/1989 |
| JP | H09-087412 A | 3/1997 |
| JP | H10-158645 A | 6/1998 |
| JP | 2006-026981 A | 2/2006 |
| JP | 2010-235926 A | 10/2010 |
| JP | 2015-014618 A | 1/2015 |
| JP | 2015-093908 A | 5/2015 |
| JP | 2017-088773 A | 5/2017 |
| JP | 2017-173782 A | 9/2017 |
| JP | 2018-002759 A | 1/2018 |
| JP | 2018-095862 A | 6/2018 |
| JP | 2018-199795 A | 12/2018 |
| JP | 2019-526688 A | 9/2019 |
| WO | 2006/054696 A | 5/2006 |
| WO | 2019/207991 A1 | 10/2019 |

OTHER PUBLICATIONS

International Preliminary Report on Patentability and Written Opinion issued in corresponding International Patent Application No. PCT/JP2020/039215 dated Apr. 26, 2022.
Supplementary European Search report dated Nov. 21, 2022, issued in corresponding European Patent Application No. 20878882.8.
International Search Report issued in corresponding International Patent Application No. PCT/JP2020/039215 dated Dec. 8, 2020.

\* cited by examiner

*Primary Examiner* — Rip A Lee
(74) *Attorney, Agent, or Firm* — Morgan, Lewis & Bockius LLP

(57) ABSTRACT

Provided is a polyethylene powder having a density of 910 $kg/m^3$ or more and less than 935 $kg/m^3$ and an average particle diameter of 50 μm or more and less than 140 μm, wherein the polyethylene powder contains a particle having a particle diameter of 60 μm and a particle having a particle diameter of 100 μm, the compressive strength at 10% displacement of the particle having a particle diameter of 60 μm is 2.0 MPa or more and less than 5.0 MPa, and the compressive strength at 10% displacement of the particle having a particle diameter of 60 μm is 0.5 times or more and less than 1.3 times the compressive strength at 10% displacement of the particle having a particle diameter of 100 μm.

8 Claims, No Drawings

POLYETHYLENE POWDER AND MOLDED ARTICLE

TECHNICAL FIELD

The present invention relates to a polyethylene powder and a molded article.

BACKGROUND ART

There are various types of molded articles that use polyethylene as a starting material, such as films, fibers, and sintered bodies. Among them, there are various types of porous sintered bodies, which are used for applications such as filters, humidifying elements for air conditioners, ink absorbers for printers, sound absorbing materials, catalysts and catalyst carriers, and lightweight structural materials.

The porous sintered bodies of polyethylene have a structure in which an infinite number of pores are continuously connected, and the performance such as filtration accuracy, air permeability, and absorbability can be controlled by controlling the porosity, the pore diameter, the thickness, or the like.

In recent years, porous materials have been used also in the fields of electronics and medical care or the like, and more precisely controlled porous sintered bodies of polyethylene are required.

For example, there is a method for suction-fixing or suction-delivering thin film-like materials such as green sheets for multilayer ceramic capacitors onto a suction stage by suction under reduced pressure in the field of electronics, as one of means for fixing or delivering the thin film-like materials. A resin porous material in the form of a sheet with air permeability as a suction cushioning material is provided on the suction surface of the suction stage and is required to have an extremely high thickness accuracy, surface smoothness, or the like (for example, see Patent Document 1). Further, an ultrahigh-molecular weight polyethylene porous material having a finely controlled pore diameter suitable for filtering collected samples has been proposed in the field of medical care (for example, see Patent Document 2).

Meanwhile, it is known that production of uniform porous sintered bodies having highly controlled pore diameter, surface smoothness, and thickness is difficult.

In order to solve such problems, several resin powders have been proposed. For example, it has been reported that a porous sintered body having a small pore diameter, so-called pore size, and a uniform pore diameter can be produced by using ethylene copolymer fine particles at least 95 weight % or more of which pass through a mesh sieve with a mesh opening of 37 µm and which have a median diameter (d50), as measured by laser diffraction light-scattering, of 3 µm≤d50≤25 µm and a circularity coefficient of 0.85 or more (for example, see Patent Document 3).

For example, a porous sheet containing an ultrahigh-molecular weight polypropylene having a melt index (MI) of less than 0.02 g/10 minutes as a main component has been disclosed, and the porous sheet is supposed to be excellent in mechanical strength and heat resistance and have reduced variations in porosity (for example, see Patent Document 4).

Further, polyethylene powders, particularly, ultrahigh-molecular weight polyethylene powders are excellent in various characteristics such as impact resistance, abrasion resistance, slidability, low-temperature characteristics, and chemical resistance, as compared with general-purpose polyethylenes. Therefore, polyethylene powders, particularly, ultrahigh-molecular weight polyethylene powders are used also as starting materials for molded articles including lining materials such as hoppers and chutes, bearings, gears, and roller guide rails.

Since these ultrahigh-molecular weight polyethylene powders have a high molecular weight and a low melt fluidity, molded articles are produced by fusing powder particles together through heat compression with a molding machine for compression molding (press molding), ram extrusion, screw extrusion, or the like. The molded articles obtained from the ultrahigh-molecular weight polyethylene powders have an extremely high impact resistance as compared with resins other than polyethylene and general-purpose polyethylene and are thus used for various applications that require impact resistance (for example, see Patent Document 5).

CITATION LIST

Patent Document

Patent Document 1: Japanese Patent Laid-Open No. 2006-26981
Patent Document 2: Japanese Patent Laid-Open No. 2015-14618
Patent Document 3: International Publication No. WO 2006/054696
Patent Document 4: Japanese Patent Laid-Open No. 9-87412
Patent Document 5: Japanese Translation of PCT International Application Publication No. 2019-526688

SUMMARY OF INVENTION

Technical Problem

A porous sintered body can be produced, for example, by a method of filling a mold with a powder, followed by heat sintering and cooling. In this method, the mold is first filled with the powder when producing the porous sintered body, but the powder size is unevenly distributed since the mold is filled with the powder while the mold is vibrated, and it is extremely difficult to uniformly fill the powder therein. As a result, the compressibility due to swelling of the powder during heat sintering differs depending on the location, resulting in a problem that variations occur in porosity, pore diameter, thickness, and the like depending on the location even within the same molded article.

The thickness of the porous sintered body is adjusted by heat compression with a compression molding machine such as a press. However, since the compressibility differs depending on the location of the porous sintered body, as described above, there are some parts where the pores significantly collapse, and it is difficult to uniformly and precisely control the air permeability, the water absorption properties, and the like.

Further, when using the porous sintered bodies as suction cushioning materials for suction delivery, surface smoothness is required. However, if strong heat compression is applied using a compression molding machine such as a press for making the surface smoother, the air permeability decreases, which is a problem.

Although it is disclosed that a porous sintered body using the ethylene polymer fine particles disclosed in Patent Document 3 has a uniform pore diameter since the ethylene polymer fine particles have a narrow particle size distribution and a high spherical degree, it is impossible to control variations in characteristics such as air permeability and water absorption properties depending on the location in the porous sintered body, which is a problem.

Since the porous sheet disclosed in Patent Document 4 has a low melt viscosity of the ultrahigh-molecular weight polypropylene, the flow during sintering is reduced in the production process, and it is merely disclosed that sintering is performed while the powder particle shape is maintained. Accordingly, the porous sheet disclosed in Patent Document 4 has a problem that it is impossible to control variations in characteristics such as air permeability and water absorption properties depending on the location of the porous sheet. Further, Patent Document 4 fails to disclose the relationship between the surface smoothness and the air permeability in the porous sheet.

Uneven distribution of powder size may occur not only during mold filling but also in hoppers or the like to introduce the powder into an extruder, thereby causing variations in characteristics depending on the location also in a molded article to be obtained by film forming or spinning, which is a problem.

A molded article using the powder can be produced, for example, by a method of filling a mold with the powder, followed by heat compression, and cooling. However, in the case of using an ultrahigh-molecular weight polyethylene powder having a low melt fluidity, long-term heat compression is required for fusing the powder particles together, and it is difficult to impart a sufficient impact resistance to the molded article in a short time, which is a problem, for example.

Patent Document 5 fails to disclose the control of the compressive strength of the ultrahigh-molecular weight powder, and the molded article does not have a sufficient impact resistance due to insufficient fusion between the ultrahigh-molecular weight powder particles, which is a problem.

Therefore, in view of the problems in the conventional arts described above, it is an object of the present invention to provide a polyethylene powder capable of suppressing uneven distribution of powder size, and a porous sintered body as one aspect of a molded article capable of suppressing variations in characteristics depending on the location of the porous sintered body, having excellent uniformity, and capable of both improving the surface roughness and suppressing reduction in air permeability at the same time by compression molding, and a molded article having improved fusibility between polyethylene powder particles and having excellent impact resistance.

Solution to Problem

As a result of dedicated studies for solving the aforementioned problems, the inventors have found that the aforementioned problems can be solved by a polyethylene powder having a predetermined density and a predetermined average particle diameter, wherein the compressive strength at 10% displacement of the particle having a predetermined particle diameter contained in the polyethylene powder and a compressive strength ratio at 10% displacement of two types of particles having predetermined particle diameters are specified, thereby accomplishing the present invention.

That is, the present invention is as follows.

[1] A polyethylene powder having a density of 910 kg/m$^3$ or more and less than 935 kg/m$^3$ and an average particle diameter of 50 μm or more and less than 140 μm, wherein the polyethylene powder comprises a particle having a particle diameter of 60 μm and a particle having a particle diameter of 100 μm, the particle having a particle diameter of 60 μm have a compressive strength at 10% displacement of 2.0 MPa or more and less than 5.0 MPa, and the compressive strength at 10% displacement of the particle having a particle diameter of 60 μm is 0.5 times or more and less than 1.3 times the compressive strength at 10% displacement of the particle having a particle diameter of 100 μm.

[2] The polyethylene powder according to [1] above, wherein the compressive strength at 20% displacement of the particle having a particle diameter of 100 μm is 1.8 times or more less than 2.4 times the compressive strength at 10% displacement of the particle having a particle diameter of 100 μm.

[3] The polyethylene powder according to [1] or [2] above, having a Tm1-half width, as measured with a differential scanning calorimeter (DSC), of 5.0° C. or more and less than 10.0° C.

[4] The polyethylene powder according to any one of [1] to [3] above, having a difference (ΔHm−ΔHc) between a melting calorie (ΔHm) and a crystallization calorie (ΔHc), as measured with a differential scanning calorimeter (DSC), of 50 J/g or more and less than 100 J/g.

[5] The polyethylene powder according to any one of [1] to [4] above, having a ratio D90/D10, as measured with a laser particle size distribution meter, of 2.0 or more and less than 3.0.

[6] The polyethylene powder according to any one of [1] to [5] above, having a total content of Al and Ti of 1 ppm or more and 10 ppm or less.

[7] A molded article of the polyethylene powder according to any one of [1] to [6] above.

[8] The molded article according to [7] above, being a porous sintered body.

Advantageous Effects of Invention

The present invention can provide a polyethylene powder capable of suppressing uneven distribution of powder size, and a porous sintered body as one aspect of a molded article capable of suppressing variations in characteristics depending on the location of the porous sintered body, having excellent uniformity, and capable of both improving the surface roughness and suppressing reduction in air permeability at the same time by compression molding, and a molded article having improved fusibility between the polyethylene powder particles and having excellent impact resistance.

DESCRIPTION OF EMBODIMENTS

Hereinafter, each embodiment for carrying out the present invention (which may be hereinafter referred to also as "the present embodiment") will be described in detail. The following embodiments are shown as examples for describing the present invention, and the present invention is not limited to these embodiments. The present invention can be carried out by being variously modified within the scope of the gist thereof.

[Polyethylene Powder]

The polyethylene powder of the present embodiment has a density of 910 kg/m$^3$ or more and less than 935 kg/m$^3$ and an average particle diameter of 50 μm or more and less than 140 μm.

Further, the polyethylene powder of the present embodiment contains a particle having a particle diameter of 60 μm and a particle having a particle diameter 100 μm. The particle having a particle diameter of 60 μm have a compressive strength at 10% displacement of 2.0 MPa or more and less than 5.0 MPa, and the compressive strength at 10% displacement of the particle having a particle diameter of 60 μm is 0.5 times or more and less than 1.3 times the compressive strength at 10% displacement of the particle having a particle diameter of 100 μm (which may be hereinafter referred to also as "compressive strength ratio based on the particle diameter").

The polyethylene powder of the present embodiment is formed by aggregation of a polyethylene particle.

The polyethylene constituting the polyethylene powder of the present embodiment is not limited to the following examples, but examples thereof suitably include ethylene homopolymers or copolymers of ethylene with other comonomers. The copolymer may be a ternary random polymer.

Other comonomers are not specifically limited, but examples thereof include α-olefins and vinyl compounds.

The α-olefins are not specifically limited, and examples thereof include α-olefins having 3 to 20 carbon atoms. Specifically, examples of the α-olefins having 3 to 20 carbon atoms include propylene, 1-butene, 4-methyl-1-pentene, 1-hexene, 1-octene, 1-nonene, 1-decene, 1-undecene, 1-dodecene, 1-tridecene, and 1-tetradecene.

The vinyl compounds are not specifically limited, and examples thereof include vinyl cyclohexane, styrene and derivatives thereof.

Further, non-conjugated polyenes such as 1,5-hexadiene and 1,7-octadiene can be used as other comonomers, as required. One of the other comonomers may be used, or two or more of them may be used in combination.

The amount of the other comonomers is preferably 0.8 mol % or less, more preferably 0.7 mol % or less, further preferably 0.6 mol % or less, with respect to ethylene. Adjusting the amount of the other comonomers to 0.8 mol % or less tends to allow a porous sintered body having excellent heat resistance and excellent rigidity to be obtained. In the case of using other comonomers, the lower limit of the amount thereof is not specifically limited, and needs only to be over 0 mol % with respect to ethylene.

The amount of polyethylene comonomers can be confirmed by infrared analysis, NMR, or the like.

The density of the polyethylene powder of the present embodiment is 910 kg/cm$^3$ or more and less than 935 kg/cm$^3$, preferably 912 kg/m$^3$ or more and 933 kg/cm$^3$ or less, more preferably 914 kg/m$^3$ or more and 931 kg/cm$^3$ or less.

Adjusting the density of the polyethylene to 910 kg/cm$^3$ or more and less than 935 kg/cm$^3$ suppresses variations in characteristics depending on the location of the molded article and tends to allow a molded article having excellent uniformity to be obtained.

Specifically, the density of the polyethylene powder can be determined by measurement by the method described in Examples.

The density of the polyethylene powder can be adjusted, for example, by adjusting the amount and molecular weight of α-olefins in the polyethylene.

(Viscosity-Average Molecular Weight (Mv))

The viscosity-average molecular weight (Mv) of the polyethylene powder of the present embodiment is not specifically limited but is preferably 50×10$^4$ or more and less than 1,000×10$^4$, more preferably 100×10$^4$ or more and less than 900×10$^4$, further preferably 150×10$^4$ or more and less than 800×10$^4$.

The viscosity-average molecular weight (Mv) of 50×10$^4$ or more reduces the flow of the resin when the powder is sintered to enable sintering with the powder shape maintained and tends to facilitate controlling the pore diameter, porosity, dimensions, and the like of the porous sintered body. Further, the viscosity-average molecular weight (Mv) of 50×10$^4$ or more improves the heat resistance of the porous sintered body, thereby enabling use in a high-temperature environment. The viscosity-average molecular weight (Mv) of less than 1,000×10$^4$ facilitates fusion between the powder particles when the powder is sintered and tends to improve the mechanical strength of the porous sintered body.

The viscosity-average molecular weight (Mv) of the polyethylene powder can be controlled to fall within the aforementioned numerical range by appropriately adjusting the polymerization conditions or the like using a catalyst, which will be described below. Specifically, the viscosity-average molecular weight (Mv) can be adjusted by allowing hydrogen to be present in the polymerization system and/or varying the polymerization temperature as the polymerization conditions.

(Average Particle Diameter)

The average particle diameter of the polyethylene powder of the present embodiment is 50 μm or more and less than 140 μm, preferably 60 μm or more and less than 130 μm, more preferably 70 μm or more and less than 120 μm.

The average particle diameter of 50 μm or more easily allows the polyethylene powder to be uniform when filled into the mold and tends to allow a molded article with variations in characteristics depending on the location of the molded article suppressed to be obtained. The average particle diameter of 50 μm or more can increase the pore diameter of the porous sintered body and tend to be able to suppress variations in water absorption rate. The average particle diameter of less than 140 μm increases the contact area between the powder particles and tends to be able to suppress variations in mechanical strength of the molded article.

The average particle diameter of the polyethylene powder can be measured by the method described in Examples below.

The average particle diameter of the polyethylene powder can be controlled by appropriately adjusting the conditions (such as temperature and ethylene pressure) in the polymerization system. Specifically, the average particle diameter can be increased by increasing the polymerization temperature and/or the polymerization pressure. The average particle diameter can be reduced by decreasing the polymerization temperature and/or the polymerization pressure.

(Compressive Strength at 10% Displacement)

The compressive strength at 10% displacement of the particle having a particle diameter of 60 μm contained in the polyethylene powder of the present embodiment is 2.0 MPa or more and less than 5.0 MPa, preferably 2.2 MPa or more and less than 4.8 MPa, more preferably 2.4 MPa or more and less than 4.6 MPa.

The particle having a particle diameter of 60 μm in the present embodiment refer to a particle of 60 μm±5 μm. The compressive strength at 10% displacement refers to a value obtained by applying a load force (test force) to one polyethylene particle with an indenter, measuring the amount deformed (compression displacement), and measuring the compressive strength at 10% deformation.

The compressive strength is a value obtained by 5 times of measurements (for each of five particles) under conditions of a flat surface of φ200 μm, a test force of 490.0 mN, and a loading rate of 4.842 mN/sec for an upper compression indenter, using a micro compression tester MCT-510, available from SHIMADZU CORPORATION, and calculation by the following expression from the test force at 10% displacement. Further, the compressive strength is an average of values calculated for the five particles.

$$C(x)=2.48 \times P/(\pi \times d \times d)$$

C(x): Compressive strength at 10% displacement (MPa)
P: Test force (N) at 10% displacement of particle diameter
d: Particle diameter (mm)

Specifically, the compressive strength can be determined by measurement by the method described in Examples.
(Compressive Strength Ratio Based on Particle Diameter)

In the present embodiment, the compressive strength at 10% displacement of the particle having a particle diameter of 60 μm is 0.5 times or more and less than 1.3 times, preferably 0.6 times or more and less than 1.2 times, more preferably 0.7 times or more and less than 1.1 times the compressive strength at 10% displacement of the particle having a particle diameter of 100 μm. The particle having a particle diameter of 100 μm in the present embodiment refer to a particle of 100 μm±5 μm.

The compressive strength at 10% displacement of the particle having a particle diameter of 60 μm being 2.0 MPa or more and less than 5.0 MPa and the compressive strength at 10% displacement of the particle having a particle diameter of 60 μm being 0.5 times or more and less than 1.3 times the compressive strength at 10% displacement of the particle having a particle diameter of 100 μm can suppress uneven distribution of the powder. These enable uniform filling into the mold and uniform supply from the hopper to the extruder and allow a molded article without variations in characteristics depending on the location to be obtained.

Further, since the entirety is deformed evenly regardless of the size of the powder during heat compression of the powder, local molding distortion is less likely to occur. Therefore, local deformation is less likely to occur when the sintered body shrinks after cooling, so that a uniform porous sintered body without variations in strength, water absorption rate, and air permeability depending on the location tends to be obtained.

Further, the deformation during heat compression can be averaged in the entire porous sintered body, so that it is possible to suppress extreme deformation on only the surface of the porous sintered body. Therefore, even if the powder is compressed during sintering or pressing, the volume of the powder itself decreases and the reduction of the pores of the porous sintered body are suppressed, so that the reduction in air permeability can be suppressed to a minimum.

In the molded article, an adjacent powder particle having a lower compressive strength is more mixed during compression, resulting in an increase in entanglement of molecular chains between the powder particles and an increase in the number of co-crystals, so that the mechanical properties tend to be improved. In particular, when the ratio of the compressive strength at 10% displacement of the particle having a particle diameter of 60 μm with respect to the compressive strength at 10% displacement of the particle having a particle diameter of 100 μm decreases, that is, when the compressive strength at 10% displacement of the powder on the fine particle side (particle diameter 60 μm) with a large specific surface area decreases, the mechanical strength tends to be further improved.

Examples of the method for controlling the compressive strength at 10% displacement of the particle having a particle diameter of 60 μm to 2.0 MPa or more and less than 5.0 MPa and controlling the compressive strength at 10% displacement of the particle having a particle diameter of 60 μm to be 0.5 times or more and less than 1.3 times the compressive strength at 10% displacement of the particle having a particle diameter of 100 μm include a method of suppressing local temperature changes during polymerization to make the inside of the polymerization system uniform.

When a catalyst having a high initial reaction activity is introduced into a polymerization reactor, a rapid reaction occurs, which tends to cause local overheating. Meanwhile, when polymerization is carried out with a catalyst having a low temperature, the polymerization reaction proceeds at a low temperature. Accordingly, it is effective to cause the reaction under uniform conditions for controlling the compressive strength and the compressive strength ratio to such predetermined ranges.

Examples of the method for setting the compressive strength and the compressive strength ratio to the predetermined ranges specifically include methods such as using a jacket cooling device and a coil cooling device in combination for adjusting the polymerization temperature, using a catalyst carrying a less amount of active Ti, mixing with a co-catalyst at a specific temperature before adding the catalyst to the polymerization system, setting the catalyst introduction temperature to a temperature 5° C. to 20° C. lower than the polymerization temperature, intermittently introducing a catalyst, setting the slurry concentration to 35% or less, setting three or more ethylene introduction points into the polymerization system, and setting the drying temperature to less than 95° C.

In the case of producing a powder by two-stage polymerization, it is preferable to perform polymerization at the first stage by the aforementioned method. Setting the slurry concentration at the first stage to 35% or less, for example, facilitates arranging the polymer at the first stage having a small compressive strength outside the powder and arranging the polymer at the second stage having an increased slurry concentration and a comparatively high compressive strength inside the powder. Further, since the catalytic activity generally tends to decrease in the polymerization at the second stage, a powder to be obtained as a result of insufficient reaction in the second polymerization step has a reduced amount of components inside the powder and thus is fine powder having a small particle diameter. Components outside the powder, which are polymerized at the first stage, are mainly contained therein, that is, the polymer, polymerized at the first stage, having a small compressive strength is considered be main, so that there is a tendency that the compressive strength and the compressive strength ratio can be adjusted within the predetermined ranges.

(Ratio of Compressive Strength at 20% Displacement with Respect to Compressive Strength at 10% Displacement)

In the present embodiment, the compressive strength at 20% displacement of the particle having a particle diameter of 100 μm is preferably 1.8 times or more and less than 2.4 times, more preferably 1.9 times or more and less than 2.3 times, further preferably 2.0 times or more and 2.2 times or less, the compressive strength at 10% displacement of the particle having a particle diameter of 100 μm.

Setting the ratio of the compressive strength at 20% displacement of the particle having a particle diameter of 100 μm with respect to the compressive strength at 10% displacement of the particle having a particle diameter of 100 μm to 1.8 times or more facilitates crushing the powder entirely, instead of crushing it locally, when the powder is excessively compressed and thus tends to improve the uniformity of the porous sintered body.

Setting the ratio of the compressive strength at 20% displacement of the particle having a particle diameter of 100 μm with respect to the compressive strength at 10% displacement of the particle having a particle diameter of 100 μm to less than 2.4 times facilitates reducing the volume of the powder itself and thus tends to suppress disappearance of pores of the porous sintered body due to deformation of the powder.

Further, when molding the polyethylene powder, it is assumed to use the polyethylene powder after mixing it with a powder of a resin with different properties or the like. At that time, the other powder and the polyethylene powder collide with each other to crush, which may generate a fine particle. At this time, the ratio of the compressive strength at 20% displacement of the particle having a particle diameter of 100 μm with respect to the compressive strength at 10% displacement of the particle having a particle diameter of 100 μm being 1.8 times or more and less than 2.4 times allows a powder having a compressive strength that gradually increases toward the inside to be obtained, so that there is a tendency that generation of the fine particle due to collision with the other powder can be suppressed.

In the present embodiment, examples of the method for controlling the compressive strength at 20% displacement of the particle having a particle diameter of 100 μm to 1.8 times or more and less than 2.4 times the compressive strength at 10% displacement of the particle having a particle diameter of 100 μm include methods such as using a jacket cooling device and a coil cooling device in combination for adjusting the polymerization temperature, using a catalyst carrying a less amount of active Ti, mixing with a co-catalyst at a specific temperature before adding the catalyst to the polymerization system, setting the catalyst introduction temperature to a temperature 5° C. to 20° C. lower than the polymerization temperature, intermittently introducing a catalyst, and setting the drying temperature to less than 95° C.

(Tm1-Half Width)

In the polyethylene powder of the present embodiment, the half width of melting peak Tm1 (which may be referred to also as Tm1-half width) in the melting curve determined using a differential scanning calorimeter (DSC) is preferably 5.0° C. or more and less than 10.0° C., more preferably 5.5° C. or more and less than 9.5° C., further preferably 6.0° C. or more and less than 9.0° C.

When the powder is sintered, the powder swells at a temperature lower than the melting peak Tm1 to cause a compression pressure. The Tm1-half width being 5.0° C. or more facilitates fusing the powder particles to each other at a lower temperature and tends to further improve the mechanical strength. Further, the Tm1-half width being 5.0° C. or more can further suppress distortion of the porous sintered body due to shrinkage in the cooling step.

In general, cooling is performed gradually for suppressing shrinkage, but the Tm1-half width of 5.0° C. or more can reduce the cooling time, which is also economically preferable. Further, even in the case where the porous sintered body is used in a high-temperature environment where the polymer begins to melt, the Tm1-half width of 5.0° C. or more suppresses melting flow and tends to maintain the shape.

The Tm1-half width of less than 10.0° C. tends to facilitate uniform melting.

Examples of the method for controlling the Tm1-half width of the melting peak of the polyethylene powder to 5.0° C. or more and less than 10.0° C. include methods such as using a catalyst carrying a less amount of active Ti, mixing with a co-catalyst at a specific temperature before adding the catalyst to the polymerization system, setting the catalyst introduction temperature to a temperature 5° C. to 20° C. lower than the polymerization temperature, intermittently introducing a catalyst, and setting the drying temperature to less than 95° C.

The Tm1-half width can be measured by the method described in Examples below.

(Difference Between Melting Calorie (ΔHm) and Crystallization Calorie (ΔHc))

In the polyethylene powder of the present embodiment, a difference (ΔHm−ΔHc) between the melting calorie (ΔHm) and the crystallization calorie (ΔHc), as determined using a differential scanning calorimeter (DSC), is preferably 50 J/g or more and less than 100 J/g, more preferably 55 J/g or more and less than 95 J/g, further preferably 60 J/g or more and less than 90 J/g.

In view of the heat resistance, the ΔHm is preferably high, and in view of the workability, particularly, for suppressing shrinkage during crystallization, the ΔHc is preferably low.

The difference between the melting calorie (ΔHm) and the crystallization calorie (ΔHc) of 50 J/g or more and less than 100 J/g allows excellent heat resistance and excellent dimensional stability at high temperature, can suppress shrinkage during crystallization, and allow excellent dimensional accuracy and excellent mechanical strength.

Examples of the method for controlling the difference between the melting calorie (ΔHm) and the crystallization calorie (ΔHc) to 50 J/g or more and less than 100 J/g include methods such as using a catalyst carrying a less amount of active Ti, mixing with a co-catalyst at a specific temperature before adding the catalyst to the polymerization system, setting the catalyst introduction temperature to a temperature 5° C. to 20° C. lower than the polymerization temperature, intermittently introducing a catalyst, and setting the drying temperature to less than 95° C.

The difference between the melting calorie (ΔHm) and the crystallization calorie (ΔHc) can be measured by the method described in Examples below.

(D90/D10)

In the polyethylene powder of the present embodiment, a ratio D90/D10, as measured with a laser particle size distribution meter, is preferably 2.0 or more and less than 3.0, more preferably 2.1 or more and less than 2.9, further preferably 2.2 or more and less than 2.8. The D90/D10 is an index indicating the particle size distribution. The larger the D90/D10, the particle size distribution is wider.

The D90/D10 of 2.0 or more tends to improve the mechanical strength of the porous sintered body. The D90/D10 of less than 3.0 gives excellent fluidity to the powder and facilitates uniformly filling the powder into the mold and tends to easily control the uniformity of the porous sintered body.

The method for controlling the D90/D10 to 2.0 or more and less than 3.0 is not specifically limited, but examples thereof include using a jacket cooling device and a coil cooling device in combination for adjusting the polymerization temperature, using a catalyst carrying a less amount of active Ti, and using a catalyst with a narrow particle size distribution.

The D90/D10 can be measured by the method described in Examples below.

(Total Content of Ti and Al)

In the polyethylene powder of the present embodiment, the total content of titanium (Ti) and aluminum (Al) is preferably 1.0 ppm or more and 10.0 ppm or less, more preferably 1.1 ppm or more and 8.0 ppm or less, further preferably 1.2 ppm or more and 6.0 ppm or less. The total content of Ti and Al mainly refers to the amount of catalyst residues.

In the polyethylene powder of the present embodiment, the total content of Ti and Al of 1.0 ppm or more reduces aggregates of powder particles and deformed powder and tends to allow the powder to have excellent fluidity.

Meanwhile, the total content of Ti and Al of 10.0 ppm or less allows the polyethylene powder to have less coloration, suppresses deterioration of polyethylene when molded, thereby making embrittlement, discoloration, and reduction in mechanical properties less likely to occur, and tends to allow more excellent long-term stability.

Examples of the method for controlling the total content of Ti and Al in the polyethylene powder to 1.0 ppm or more and 10.0 ppm or less include controlling the productivity of the polyethylene powder per unit catalyst. The productivity of the polyethylene powder can be controlled by adjusting the polymerization temperature, the polymerization pressure, or the slurry concentration in the reactor during production. That is, the method for increasing the productivity of the polyethylene powder of the present embodiment include: increasing the polymerization temperature; increasing the polymerization pressure; and increasing the slurry concentration.

The catalyst to be used is not specifically limited, and a common Ziegler-Natta catalyst or metallocene catalyst can be used, but the later-described catalyst is preferably used.

Further, it is also possible to remove Ti and Al from the polyethylene powder by the methods such as washing the polyethylene powder with water or a weakly acidic aqueous solution.

The total content of Ti and Al in the polyethylene powder can be measured by the method described in Examples below.

(Method for Producing Polyethylene Powder)

The polyethylene constituting the polyethylene powder of the present embodiment can be produced by a conventionally known polymerization method. Examples of the polymerization method, but are not limited to, include methods of (co)polymerizing ethylene alone or monomers containing ethylene by slurry polymerization, vapor phase polymerization, solution polymerization, or the like. In particular, slurry polymerization capable of efficiently removing polymerization heat is preferable. In slurry polymerization, an inert hydrocarbon medium can be used as a medium, and an olefin itself also can be used as a medium.

Examples of the inert hydrocarbon medium include, but not specifically limited to, aliphatic hydrocarbons such as propane, butane, isobutane, pentane, isopentane, hexane, heptane, octane, decane, dodecane, and kerosene; alicyclic hydrocarbons such as cyclopentane, cyclohexane, and methyl cyclopentane; aromatic hydrocarbons such as benzene, toluene, and xylene; halogenated hydrocarbons such as ethyl chloride, chlorobenzene, and dichloromethane; and mixtures of these.

In the polymerization step of the polyethylene powder, an inert hydrocarbon medium having 6 or more and 10 or less carbon atoms is preferably used. Having 6 or more carbon atoms allows low molecular weight components generated due to side reactions during ethylene polymerization or deterioration of polyethylene to be comparatively easily dissolved and tends to allow removal to be performed easily in the step of separating polyethylene from the polymerization medium. Having 10 or less carbon atoms suppresses adhesion of the polyethylene powder to the reaction vessel and tends to allow industrially stable operation.

The polymerization temperature is generally 30° C. or more and 100° C. or less, preferably 35° C. or more and 95° C. or less, more preferably 40° C. or more and 90° C. or less. The polymerization temperature of 30° C. or more tends to enable industrially efficient production. The polymerization temperature of 100° C. or less tends to enable continuously stable production.

Further, a jacket device and a coil cooling device are preferably used in combination for controlling the polymerization temperature. The coil cooling device is preferably located in the reaction vessel and has a low temperature medium circulated in the coil conduit. In general, heat is vigorously generated in the polymerization of polyethylene when a catalyst is added to a solvent with ethylene introduced therein, so that heat tends to be locally generated, making it difficult to adjust the temperature in the polymerization system. Use of cooling by the jacket and cooling by the coil cooling device in combination can accurately suppress local heat generation and variations in polymerization temperature.

The polymerization pressure is generally the normal pressure or more and 2.0 MPa or less, preferably 0.1 MPa or more and 1.5 MPa or less, more preferably 0.1 MPa or more and 1.0 MPa or less.

The polymerization reaction can be performed by any of the batch method, the semi-continuous method, and the continuous method. Among these, polymerization is preferably performed by the continuous method. A partial high-temperature state due to a rapid ethylene reaction can be suppressed by continuously supplying an ethylene gas, a solvent, a catalyst, and the like into the polymerization system and continuously discharging the ethylene gas, the solvent, the catalyst, and the like together with the polyethylene powder produced, so that the inside of the polymerization system tends to be more stabilized.

In the production of the polyethylene powder, the polymerization can be divided into two or more stages having different reaction conditions.

In the production of the polyethylene powder of the present embodiment, catalytic components may be used. Suitable examples of the catalytic components include, but are not limited to, Ziegler-Natta catalysts, metallocene catalysts, and Phillips catalysts.

As a Ziegler-Natta catalyst, the catalyst described in Japanese Patent No. 5767202 can be suitably used. Examples of the metallocene catalysts that can be suitably used include, but are not limited to, the catalysts described in Japanese Patent Laid-Open No. 2006-273977 and Japanese Patent No. 4868853. Further, the catalytic components to be used in the production process of the polyethylene powder of the present embodiment may include co-catalysts such as triisobutyl aluminum and Tebbe reagents.

The average particle diameter of such a catalyst is preferably 0.1 μm or more and 20 μm or less, more preferably 0.2 μm or more and 16 μm or less, further preferably 0.5 μm or more and 12 μm or less. There is a tendency that the average particle diameter of the catalyst of 0.1 μm or more can prevent problems such as scattering and adhesion of the polyethylene powder to be obtained. There is a tendency that the average particle diameter of the catalyst of 20 μm or less can prevent problems such as the polyethylene powder becoming excessively large and sedimenting in the polymerization system, and causing line blockage in the post-treatment step of the polyethylene powder.

The particle diameter distribution of the catalyst can be controlled by removing a fine particle and a coarse particle by decantation, sieving, centrifugation, or cyclone. In particular, the fine particle can be effectively removed by reducing the sedimentation time in the decantation method in which mixing and sedimentation of the catalyst and removal of the solvent are repeated.

In the production of the polyethylene powder of the present embodiment, it is preferable to mix a main catalyst with a co-catalyst at a temperature of 45° C. or more and less than 55° C. to perform the operation of bringing them into contact for 1 hour, and then to add the mixture to the polymerization system, as a pretreatment of the catalyst. The contact of the main catalyst with the co-catalyst in advance tends to allow control of the compressive strength and the compressive strength ratio within the ranges in the present embodiment.

The catalyst introduction temperature is preferably a temperature 5° C. to 20° C. lower than the polymerization temperature. There is a tendency that the compressive strength and the compressive strength ratio can be controlled to the ranges in the present embodiment by setting the catalyst introduction temperature to a temperature 5° C. to 20° C. lower than the polymerization temperature. Further, even if heat generation due to the initial activity is taken into account, local temperature changes are reduced, and the temperature in the polymerization system can be uniformly maintained.

The catalyst is preferably added intermittently. The method for adding the catalyst is not specifically limited, and repeating continuous addition for 1 minute or more and less than 5 minutes and then pause of addition for 1 minute or more and less than 3 minutes suppresses local temperature changes, so that the inside of the polymerization system tends to be further uniform, for example.

The slurry concentration in the polymerization system is preferably 35% or less, more preferably 30% or less, further preferably 25% or less. The slurry concentration of 35% or less tends to further reduce the compressive strength on the fine particle side.

The slurry concentration is defined by powder mass/
(powder mass+solvent mass)×100.

The slurry concentration can be controlled to such a numerical range by adjusting the amount of powder to be generated. Specifically, examples of the control method include methods such as reducing the amount of solid catalysts to be added and reducing the amount of ethylene to be added.

The method for inactivating a catalyst using the polyethylene powder in the production process is not specifically limited, but it is preferable to use a method for inactivating the catalyst after separating the polyethylene powder from the solvent. Adding an agent for inactivating the catalyst after separation from the solvent can suppress precipitation of catalytic components or the like dissolved in the solvent. Examples of the agent for inactivating the catalyst include, but are not limited to, oxygen, water, alcohols, glycols, phenols, carbon monoxide, carbon dioxide, ethers, carbonyl compounds, and alkynes.

The molecular weight of the polyethylene powder of the present embodiment can be controlled, for example, by allowing hydrogen to be present in the polymerization system, as described in West German patent application publication No. 3127133, and adopting a method for varying the polymerization temperature. Further, adding hydrogen into the polymerization system as a chain transfer agent tends to facilitate controlling the molecular weight to an appropriate range. In the case of adding hydrogen into the polymerization system, the mole fraction of hydrogen is preferably 0 mol % or more and 100 mol % or less, more preferably 0 mol % or more and 80 mol % or less, further preferably 0 mol % or more and 60 mol % or less.

In the production process of the polyethylene powder of the present embodiment, the polyethylene powder is separated from the solvent. Examples of the separation method from the solvent include decantation, centrifugation, and filtration. Since the separation efficiency of the polyethylene powder from the solvent is high, centrifugation is preferable.

In the production process of the polyethylene powder of the present embodiment, a drying process is preferably performed after the solvent is separated.

The drying temperature is preferably 70° C. or more and less than 95° C., more preferably 75° C. or more and 90° C. or less, further preferably 80° C. or more and 85° C. or less.

The drying temperature of 70° C. or more tends to allow efficient drying. The drying temperature of 105° C. or less tends to allow drying while aggregation of the polyethylene powder and thermal degradation are suppressed.

In the production process of the polyethylene powder of the present embodiment, drying using a rotary dryer to make the polymer temperature 85° C. or more and less than 90° C. is preferable. In such a case, there is a tendency that the compressive strength and the compressive strength ratio can be controlled to the ranges in the present embodiment.

(Additives)

The polyethylene powder of the present embodiment may further contain additives such as neutralizers, antioxidants, and light-resistant stabilizers, for example.

The neutralizers are used as chlorine catchers contained in the polyethylene powder, molding aids, or the like. The neutralizers are not specifically limited, but examples thereof include stearates of alkaline earth metals such as calcium, magnesium, and barium.

The content of the neutralizers is not specifically limited, but is preferably 5,000 ppm or less, more preferably 4,000 ppm or less, further preferably 3,000 ppm or less, with respect to the total amount of the polyethylene powder, or it is not necessary to use them.

The antioxidants are not specifically limited, but examples thereof include phenolic antioxidants such as dibutylhydroxytoluene, pentaerythritol-tetrakis [3-(3,5-di-t-butyl-4-hydroxyphenyl) propionate], and octadecyl-3-(3,5-di-t-butyl-4-hydroxyphenyl) propionate.

The content of the antioxidants is not specifically limited but is preferably 5,000 ppm or less, more preferably 4,000 ppm or less, further preferably 3,000 ppm or less, or it is not necessary to use them.

The light-resistant stabilizers are not specifically limited, but examples thereof include benzotriazole light-resistant stabilizers such as 2-(5-methyl-2-hydroxyphenyl) benzotriazole and 2-(3-t-butyl-5-methyl-2-hydroxyphenyl)-5-chlorobenzotriazole; and hindered amine light-resistant stabilizers such as bis(2,2,6,6-tetramethyl-4-piperidine) sebacate and poly[{6-(1,1,3,3-tetramethylbutyl)amino-1,3,5-triazine-2,4-diyl}{(2,2,6,6-tetramethyl-4-piperidyl)
imino}hexamethylene{(2,2,6,6-tetramethyl-4-piperidyl)
imino}].

The content of the light-resistant stabilizers is not specifically limited but is preferably 5,000 ppm or less, more preferably 4,000 ppm or less, further preferably 3,000 ppm or less, or it is not necessary to use them.

The content of additives to be contained in the polyethylene powder of the present embodiment can be determined, for example, by Soxhlet extraction of the additives in the polyethylene powder using tetrahydrofuran (THF) for 6 hours and separating and quantifying the extract by liquid chromatography.

With the polyethylene powder of the present embodiment, other polyethylenes with a different viscosity-average molecular weight or a different molecular weight distribution can be blended. Examples of the other polyethylenes include low-density polyethylenes and linear low-density polyethylenes. Other than the above, it is also possible to blend other resins such as polypropylenes and polystyrenes.

Further, the polyethylene powder of the present embodiment can be suitably used by being processed into pellets in addition to the powder form.

[Molded Article]

The polyethylene powder of the present embodiment can be applied to various applications by various processing methods.

The molded article of the present embodiment can be produced by molding the polyethylene powder of the present embodiment. Due to its excellent uniformity, the molded article can be suitably used as a molded article in the form of a microporous membrane, fibers, a sheet, or a block, or a porous sintered body.

The porous sintered body of the present embodiment can be used, for example, as a general industrial member such as a delivery sheet to be suction-fixed and can be used also in the field of life science as a support sheet of a rapid inspection kit by immunochromatography, a filter for apheresis treatment, a filter for artificial dialysis or the like, various implants, a pre-filter of a biological analysis kit or the like, a support such as a low-rigidity filter, and a support of an ion exchange resin, or in the field of electronics as an ink absorber for printer heads, a support of a solid electrolyte, a member for fuel cells, and a separator for lithium ion secondary batteries or lead-acid batteries.

EXAMPLES

Hereinafter, the present embodiments will be described in detail by way of specific Examples and Comparative Examples, but the present embodiments are not limited by the following Examples and Comparative Examples at all.

[Method for Measuring Various Characteristics and Physical Properties]

Various physical properties were measured by the methods shown below.

(1) Average Particle Diameter 100 g of polyethylene powder was weighed into a 200-mL resin cup, and 1 g of carbon black was added thereto, followed by sufficient stirring with a dispensing spoon. A particle diameter at 50% mass in an integral curve integrating the mass of the polyethylene powder remaining in each sieve to be obtained when the polyethylene powder stirred was classified by sieves with mesh openings of 300 μm, 212 μm, 150 μm, 106 μm, 75 μm, and 53 μm according to JIS Z 8801 standard from the smaller mesh opening side was taken as an average particle diameter.

(2) Viscosity-Average Molecular Weight (Mv)

First, 20 mg of the polyethylene powder was added into 20 mL of decalin (decahydronaphthalen), followed by stirring at 150° C. for 2 hours, so that the polyethylene powder was dissolved to obtain a solution. The solution was measured for the fall time ($t_s$) between marked lines in a constant temperature bath at 135° C. using an Ubbelohde viscometer. Likewise, three solutions with different weights of the polyethylene powder were produced and measured for the fall time. As a blank, only decalin with no polyethylene powder added was measured for the fall time ($t_b$).

The reduction viscosity ($\eta_{sp}/C$) of each polymer determined according to the following formula was plotted to derive the linear equation of the concentration (C) (unit: g/dL) and the reduction viscosity ($\eta_{sp}/C$) of the polymer, to determine an ultimate viscosity ($[\eta]$) extrapolated to the concentration of 0.

$\eta_{sp}/C=(t_s/t_b-1)/C$ (unit: dL/g)

Then, the viscosity-average molecular weight (Mv) was calculated using the value of the ultimate viscosity ($[\eta]$) by the following (expression A).

$$Mv=(5.34\times10^4)\times[\eta]^{1.49} \quad \text{(expression A)}$$

(3) Density

The density of the polyethylene powder was determined by measuring a section cut out from a press sheet of the polyethylene powder as a sample for density measurement annealed at 120° C. for 1 hour and then cooled at 25° C. for 1 hour, according to JIS K 7112. The press sheet of the polyethylene powder was produced according to ASTM D 1928 Procedure C using a mold with a length of 60 mm, a width of 60 mm, and a thickness of 2 mm.

(4) Content of Comonomer

The content of the comonomer of the polyethylene powder obtained each of Examples and Comparative Examples was measured by $^{13}$C-NMR under the following conditions.
Device: AVANCEIII 500HD Prodigy (Bruker Biospin)
Observation frequency: 125.77 MHz ($^{13}$C)
Pulse width: 5.0 μsec
Pulse repetition time: 5 sec
Cumulative number: 10,000 times
Measurement temperature: 120° C.
Reference: 29.9 ppm (PE: Sδδ)
Solvent: o-$C_6D_4Cl_2$
Sample concentration: 0.1 g/mL
Sample tube: 5 mmφ

0.6 mL of o-$C_6D_4Cl_2$ put into 60 mg of polyethylene polymer powder as a measurement sample was dissolved under heating at 130° C.

(5) Compressive Strength

The polyethylene powder having a particle diameter of 60 μm for measuring compressive strength was classified by sieves with mesh openings of 63 μm and 53 μm according to JIS Z 8801 standard, and the polyethylene powder having an average of the long side and the short side of about 60 μm was selected with a system microscope BX43, manufactured by Olympus Corporation. Subsequently, polyethylene particles having an average of the long side and the short side of 60 μm±5 μm were selected at random from the selected polyethylene powder with an optical monitor of a micro-compression tester, and the compressive strength was measured using them.

Further, the polyethylene powder having a particle diameter of 100 μm for measuring compressive strength was classified by sieves with mesh openings of 106 μm and 90 μm, and polyethylene particles of 100 μm±5 μm were selected at random from the selected polyethylene powder by the same method as the particle diameter of 60 μm, and the compressive strength was measured using them.

The compressive strength was measured using a micro-compression tester MCT-510, available from SHIMADZU CORPORATION, according to JIS R 1639-5. Specifically, one particle of the polyethylene powder selected was placed on the lower sample table, to measure the particle diameter under conditions of an upper compression indenter with a flat surface of φ200 μm, a test force of 490.0 mN, and a loading rate of 4.842 mN/sec.

The measurement was performed 5 times (for five particles selected at random), and the average of the measured values of each of the five particles was evaluated.

The compressive strengths C(x) at 10% displacement and 20% displacement were calculated from the test force at 10% displacement or 20% displacement by the following expression.

$$C(x)=2.48\times P/(\pi\times d\times d)$$

C(x): Compressive strength (MPa) at 10% displacement or 20% displacement
P: Test force (N) at 10% displacement or 20% displacement of particle diameter
d: Particle diameter (mm)

The average of the long side of and short side of the powder was taken as a particle diameter d.

As described above, the compressive strength at 10% displacement of the particles having a particle diameter of 60 μm, the compressive strength at 10% displacement of the particles having a particle diameter of 100 μm, and the compressive strength at 20% displacement of the particles having a particle diameter of 100 μm were determined, to calculate "the ratio of the compressive strength at 10% displacement of the particles having a particle diameter of 60 μm with respect to the compressive strength at 10% displacement of the particles having a particle diameter of 100 μm" and "the ratio of the compressive strength at 20% displacement of the particles having a particle diameter of 100 μm with respect to the compressive strength at 10% displacement thereof".

(6) Tm1-Half Width and Difference Between Melting Calorie (ΔHm) and Crystallization Calorie (ΔHc)

The Tm1-half width of the polyethylene powder, ΔHm (melting calorie), and ΔHc (crystallization calorie) were measured using DSC (product name: DSC8000, manufactured by PerkinElmer, Inc.).

8 to 10 mg of the polyethylene powder was weighed and put into an aluminum sample pan. An aluminum cover was attached to the pan, which was installed in the differential scanning calorimeter.

Under purging with nitrogen at a flow rate of 20 mL/minute, each sample and the reference sample were held at 50° C. for 1 minute, heated to 180° C. at a rate of 10° C./minute, held at 180° C. for 5 minutes, and then cooled to 50° C. at a rate of 10° C./minute. The temperature width at half the height of the melting peak in the melting curve obtained in the heating process was defined as a Tm1-half width.

The gross heating value calculated from the melting peak area was divided by the sample mass to determine a melting calorie (ΔHm). Further, the gross heating value calculated from the crystallization peak area in the crystallization curve obtained in the cooling process was divided by the sample mass to determine a crystallization calorie (ΔHc). The "difference between the melting calorie (ΔHm) and the crystallization calorie (ΔHc)" was calculated from the melting calorie (ΔHm) and the crystallization calorie (ΔHc).

(7) D90/D10

The ratio D90/D10 in the polyethylene powder was measured using a laser particle size distribution analyzer (product name SALD-2100), manufactured by SHIMADZU CORPORATION.

The measurement was performed using methanol as a dispersion medium, to plot a cumulative particle size distribution from the small-particle diameter side. The particle diameters at cumulative percentages of 10% and 90% were respectively taken as D10 and D90.

From these D10 and D90 values, the ratio "D90/D10" was calculated.

(8) Total Content of Ti and Al

The polyethylene powder was pressure-decomposed using a microwave decomposition apparatus (type ETHOS TC, manufactured by Milestone General K.K.), to measure the elemental concentrations of Ti and Al as metals in the polyethylene powder by the internal standard method using ICP-MS (induction coupled plasma mass spectrometer, type X Series X7, manufactured by Thermo Fisher SCIENTIFIC K.K.).

The sum of the elemental concentrations of Ti and Al was taken as the total content of Ti and Al.

(Evaluation 1) Tensile Breaking Strength

For evaluating the tensile breaking strength of the polyethylene powder, a porous sintered body with a size of 400 mm×400 mm and a thickness of 2.0 mm after pressing was used. The average of 10 times of measurements using TENSILON RTC-1310A, manufactured by A&D Company, Limited, according to JIS K 7161-1 was taken as a tensile breaking strength.

⊚ indicates that the tensile breaking strength was 5.5 MPa or more.
○ indicates that the tensile breaking strength was 4.5 MPa or more and less than 5.5 MPa.
x indicates that the tensile breaking strength was less than 4.5 MPa.

(Evaluation 2) Variations in Tensile Breaking Strength and Water Absorption Rate The porous sintered body with a size of 400 mm×400 mm and a thickness of 2.0 mm after pressing obtained in each of Examples and Comparative Examples was used, to evaluate the tensile breaking strength and the water absorption rate by the following method.

The tensile breaking strength was measured 10 times, using TENSILON RTC-1310A, manufactured by A&D Company, Limited, according to JIS K 7161-1.

The water absorption rate was determined by the height of water absorption per minute. For evaluating the height of water absorption, 20 mm in the lower part of a porous sintered body with a width of 10 mm and a height of 100 mm was perpendicularly immersed at 25° C. under the atmospheric pressure in water at 25° C., to measure the water absorption distance due to the capillary action 1 minute after the immersion 10 times.

As described above, variations in tensile breaking strength and water absorption rate were each calculated by the following expression and evaluated as follows.

Variation (%)={(maximum value or minimum value)−(average)}/(average)×100

⊚ indicates that the variation in tensile breaking strength was less than 10%, and the variation in water absorption rate was less than 5%.
○ indicates that the variation in tensile breaking strength was 10% or more and less than 15%, and the variation in water absorption rate was 5% or more and less than 10%.
x indicates that the variation in tensile breaking strength was 15% or more, and the variation in water absorption rate was 10% or more.

(Evaluation 3) Surface Roughness (Ra) Improvement Rate and Air Permeability Reduction Rate of Porous Sintered Body Before and After Pressing Each porous sintered body with a size of 400 mm×400 mm and a thickness of 2.0 mm before and after pressing obtained in Examples and Comparative Examples was divided into 50 mm×50 mm sections, and the surface roughnesses and the air permeabilities at 64 sites were each measured, to calculate the rates of changes in surface roughness and air permeability before and after pressing by the following calculation formula.

Surface roughness improvement rate (%)=surface roughness before pressing/surface roughness after pressing×100

Air permeability reduction rate (%)=air permeability before pressing/air permeability after pressing× 100

As described above, the evaluation was performed from the average of the rates of changes in surface roughnesses and air permeabilities at 64 sites, as follows.
◎ indicates that the surface roughness improvement rate was 40% or more, and the air permeability reduction rate was less than 40%.
○ indicates that the surface roughness improvement rate was 40% or more, and the air permeability reduction rate was 40% or more and less than 50%.
x indicates that the surface roughness improvement rate was less than 40%, and the air permeability reduction rate was 50% or more.

The surface roughness (Ra) was measured using a stylus-type surface roughness meter ("HANDYSURF E-35B", manufactured by TOKYO SEIMITSU CO., LTD.) under the conditions of tip diameter R: 5 μm, velocity: 0.6 mm/s, measurement length: 12.5 mm, and cutoff value λc: 2.5 mm.

The air permeability was measured using an air permeability measuring instrument ("FX3360PORTAIR", manufactured by TEXTEST AG) under the conditions of a measurement range of 20 cm² and a measurement differential pressure of 125 Pa.

(Evaluation 4) Variation in Air Permeability of Porous Sintered Body

The porous sintered body with a size of 400 mm×400 mm and a thickness of 2.0 mm after pressing obtained in each of Examples and Comparative Examples was divided into 50 mm×50 mm sections, and the air permeabilities at 64 sites were each measured and evaluated, as follows.
◎ indicates that the differences of the average of the air permeabilities at 64 sites from the maximum value and from the minimum value were each less than 10%.
○ indicates that the differences of the average of the air permeabilities at 64 sites from the maximum value and from the minimum value were each 10% or more and less than 15%.
x indicates that the differences of the average of the air permeabilities at 64 sites from the maximum value and from the minimum value were each 15% or more.

The air permeability was measured using an air permeability measuring instrument ("FX3360PORTAIR", manufactured by TEXTEST AG) under the conditions of a measurement range of 20 cm² and a measurement differential pressure of 125 Pa.

(Evaluation 5) Powder Crushability 50 parts by mass of the polyethylene powder obtained and 50 parts by mass of polyethylene powder (K4750P, manufactured by Asahi Kasei Corporation) to be compared were stirred using a 10-L Henschel mixer at a rotational speed of 150 rpm/minute (circumferential velocity of 21.6 m/sec) for 20 minutes.

The polyethylene powder after stirring was determined for the mass of the polyethylene powder passed through a mesh opening of less than 75 μm (the sum of the mass of the polyethylene powder on a 53 μm sieve and the mass of the polyethylene powder passed through the 53 μm sieve) by the same method as described for the measurement of the average particle diameter. The rate of increase in mass of the polyethylene powder passed through a mesh opening of less than 75 μm after stirring with respect to that before stirring was determined and evaluated, as follows.
◎ indicates that the rate of increase in polyethylene powder passed through a mesh opening of less than 75 μm was less than 5%.
○ indicates that the rate of increase in polyethylene powder passed through a mesh opening of less than 75 μm was 5% or more and less than 10%.
x indicates that the rate of increase in polyethylene powder passed through a mesh opening of less than 75 μm was 10% or more.

(Evaluation 6) Evaluation of Uneven Distribution of Powder

The polyethylene powder obtained was put into a hopper and vibrated at 3,000 VPM for 20 minutes using a vibrator. 10 parts by mass of the polyethylene powder was collected from each of the upper part and the lower part of the hopper with respect to 100 parts by mass of the polyethylene powder put and used as a starting material of high-strength fibers.

93 mass % of decalin (manufactured by Hiroshima Wako Co., Ltd.) was mixed with 7 mass % of the polyethylene powder to prepare a slurry liquid. The slurry liquid was put into an extruder set to a temperature of 260° C. and a melt residence time of 15 minutes to form a homogeneous solution. This solution was spun at a single-pore discharge rate of 1.1 g/minute using a spinneret having a pore diameter of 0.7 mm set at 180° C. The yarn containing the solvent discharged was put into a water bath at 10° C. through a 3-cm air gap and wound up at a speed of 40 m/minute under rapid cooling.

Then, the yarn was vacuum-dried at 40° C. for 24 hours to remove the solvent. The yarn obtained was brought into contact with a metal heater to a yarn temperature of 130° C. and primarily drawn at a drawing ratio of 4 times, and the yarn drawn was wound up. Then, the drawn yarn was brought into contact with a metal heater to a yarn temperature of 155° C. and further secondarily drawn, and the drawing ratio immediately before the yarn was cut was defined as the limit drawing ratio. The limit drawing ratio was measured 10 times and evaluated from the average, as follows.
◎ indicates that the difference in limit drawing ratio between the sample at the upper part and the sample at the lower part of the hopper was less than 2 times.
○ indicates that the difference in limit drawing ratio between the sample at the upper part and the sample at the lower part of the hopper was 2 times or more and less than 5 times.
x indicates that the difference in limit drawing ratio between the sample at the upper part and the sample at the lower part of the hopper was 5 times or more.

(Evaluation 7) Charpy Impact Strength and Impact Resistance of Molded Article

The polyethylene powder was subjected to compression molding (press molding) according to ISO11542 to obtain a molded article.

The test piece was cut out and subjected to the Charpy impact test according to ISO179-1.

The Charpy impact test was conducted 10 times, to determine the average thereof, which was compared with the impact resistance calculated by the following expression, to evaluate the impact resistance of the molded article, as follows.

Impact resistance=0.0003×[viscosity-average molecular weight (*Mv*)]$^2$−0.293×[viscosity-average molecular weight (*Mv*)]+192.52

⊚ indicates that the average was higher than the impact resistance determined by the aforementioned expression by 10 KJ/m$^2$ or more.
○ indicates that the average was equal to or higher than the impact resistance determined by the aforementioned expression and less than +10 KJ/m$^2$.
x indicates that the average was less than the impact resistance determined by the aforementioned expression.

[Preparation Examples] Synthesis of Catalyst (Preparation of Solid Catalytic Component [A])
<(1) Synthesis of Starting Material (a-1)>
2,000 mL (equivalent to 2000 mmol of magnesium and aluminum) of a 1-mol/L $Mg_6(C_4H_9)_{12}Al(C_2H_5)_3$ hexane solution was put into an 8-L stainless steel autoclave fully purged with nitrogen, and 146 mL of a 5.47-mol/L n-butanol hexane solution was added dropwise over 3 hours under stirring at 50° C. After completion, the line was washed with 300 mL of hexane. Further, stirring was continued at 50° C. over 2 hours.

After the completion of the reaction, the resultant cooled to the normal temperature was used as a starting material (a-1). The starting material (a-1) had a magnesium concentration of 0.704 mol/L.
<(2) Synthesis of Starting Material (a-2)>
2,000 mL (equivalent to 2000 mmol of magnesium and aluminum) of a 1-mol/L $Mg_6(C_4H_9)_{12}Al(C_2H_5)_3$ hexane solution was put into an 8-L stainless steel autoclave fully purged with nitrogen, and 240 mL of an 8.33-mol/L methyl hydrogen polysiloxane (manufactured by Shin-Etsu Chemical Co., Ltd.) hexane solution was added dropwise over 3 hours under stirring at 80° C. After completion, the line was washed with 300 mL of hexane. Further, stirring was continued at 80° C. over 2 hours.

After the completion of the reaction, the resultant cooled to the normal temperature was used as a starting material (a-2). The starting material (a-2) had a total concentration of magnesium and aluminum of 0.786 mol/L.
<(3) Synthesis of Carrier (A-1)>
1,000 mL of a 1-mol/L hydroxytrichlorosilane hexane solution was put into an 8-L stainless steel autoclave fully purged with nitrogen, 1340 mL of a hexane solution of an organic magnesium compound of the starting material (a-1) (equivalent to 943 mmol of magnesium) was added at 65° C. dropwise over 3 hours, and the reaction was further continued under stirring at 65° C. for 1 hour.

After the completion of the reaction, the supernatant was removed, and the resultant was washed with 1,800 mL of hexane 4 times, to obtain a carrier (A-1). As a result of analyzing the carrier, magnesium contained in 1 g of solid was 7.5 mmol.
<(4) Preparation of Solid Catalytic Component [A]>
To 1,970 mL of a hexane slurry containing 110 g of the carrier (A-1), were added 82 mL of a 0.8-mol/L titanium tetrachloride hexane solution and 105 mL of the starting material (a-2) simultaneously over 3 hours under stirring at 25° C. After the addition, the reaction was continued for 1 hour by heating to 40° C.

After the completion of the reaction, the supernatant was removed, and the resultant was washed with hexane 6 times, to remove unreacted starting material components, thereby preparing a solid catalytic component [A].
(Preparation of Solid Catalytic Component [B])
To 1,970 mL of a hexane slurry containing 110 g of the carrier (A-1), were added 103 mL of a 1.0-mol/L titanium tetrachloride hexane solution and 131 mL of the starting material (a-2) simultaneously over 3 hours under stirring at 10° C. After the addition, the reaction was continued for 1 hour by heating to 10° C. After the completion of the reaction, the supernatant was removed, and the resultant was washed with hexane twice, to remove unreacted starting material components, thereby preparing a solid catalytic component [B].

Example 1

(Production of Polyethylene Powder)
Hexane, ethylene, and a catalyst were continuously supplied into a vessel-type 300-L polymerization reactor provided with a stirrer, a jacket cooling device, and a coil cooling device, to polymerize polyethylene at a polymerization pressure of 0.45 MPa and a polymerization temperature of 74° C. Dehydrated normal hexane was supplied as a solvent at 40 L/hour. Ethylene was supplied from the bottom of the polymerizer separately at three sites to keep the polymerization pressure at 0.45 MPa. As the catalyst, the solid catalytic component [A] (1.1 mmol/hour in terms of Ti atoms) and triisobutyl aluminum (20 mmol/hour) as a co-catalyst mixed in advance at 50° C. for 1 hour were adjusted to 56° C., and then the mixture was added to the polymerization system at a rate at which the solid catalytic component [A] was 0.16 g/hr. The catalyst was added intermittently by performing continuous addition for 3 minutes and then stopping the addition for 1 minute.

The catalytic activity was 68,000 g-PE/g-solid catalytic component [A], the production rate of polyethylene was 8 kg/hr, and the slurry concentration was 33%. The polymerization slurry was continuously withdrawn into a flash drum at a pressure of 0.04 MPa so that the level of the polymerization reactor was kept constant, to separate unreacted ethylene.

Then, the polymerization slurry was continuously sent to a centrifuge so that the level of the polymerization reactor was kept constant, to separate the polymer and other components such as the solvent.

The polyethylene powder separated was introduced into a dryer. Drying was carried out for 0.5 hours while blowing nitrogen at 90° C. In this drying step, steam was sprayed on the powder after the polymerization to deactivate the catalyst and the co-catalyst. To the polyethylene powder obtained, was added 500 ppm of calcium stearate (C60, manufactured by DAINICHI CHEMICAL INDUSTRY CO., LTD.), and the mixture was uniformly mixed using a Henschel mixer. Subsequently, the polyethylene powder was passed through a sieve with a mesh opening of 425 μm, and those that did not pass through the sieve were removed, to obtain polyethylene powder. The viscosity-average molecular weight was 416×10$^4$ g/mol. Table 1 shows the characteristics of the polyethylene powder obtained.
(Method for Producing Porous Sintered Body)
0.3 parts by mass of polyoxyethylene sorbitan monolaurate was dry-mixed with 100 parts by mass of the polyethylene powder using a high-speed mixer under heating to 80° C. The hydrophilized polyethylene powder obtained was used as a starting material for a sintered body.

An aluminum mold with internal dimensions of a thickness of 2.15 mm, 400 mm×400 mm, and a thickness of the mold of 2 mm was used. An aluminum plate serving as the upper cover of the mold was removed, and the polyethylene powder was filled in 30 seconds while vibrating with a vibrator. After returning the upper cover to the original position, the mold was heated in an oven at 210° C. for 20 minutes and cooled at room temperature to obtain a porous polyethylene sintered body with a thickness of about 2.0 mm. The porous sintered body obtained was press-molded using a 2.0 mm spacer. The residual heat was applied at 80° C. for 15 minutes, and pressing was applied at 80° C. and 1.0 MPa for 3 minutes, followed by cooling at room temperature, to obtain a porous polyethylene sintered body with a thickness of 2.0 mm. Table 1 shows the characteristics of the porous sintered body.

Example 2

A polyethylene powder with a viscosity-average molecular weight of $650 \times 10^4$ g/mol was obtained by the same operations as in Example 1, except that the temperature when adding the catalyst was set to 50° C., the polymerization temperature was set to 58° C., and the polymerization pressure was set to 0.43 MPa in the polymerization step.

The porous sintered body of Example 2 was obtained by the same operations as in Example 1.

Example 3

A polyethylene powder with a viscosity-average molecular weight of $429 \times 10^4$ g/mol and a content of comonomers of 0.34 mol % was obtained by the same operations as in Example 1, except that the temperature when adding the catalyst was set to 50° C., the polymerization temperature was set to 57° C., the polymerization pressure was set to 0.50 MPa, 1-butene in an amount of 6.6 mol % and hydrogen in an amount of 81.4 mol % with respect to ethylene were introduced, in the polymerization step.

The porous sintered body of Example 3 was obtained by the same operations as in Example 1.

Example 4

In order to produce a high-molecular weight component at the first stage of the polymerization, hexane, ethylene, hydrogen, and a catalyst were first continuously supplied into a vessel-type 300-L polymerization reactor as in Example 1, to polymerize polyethylene at a polymerization pressure of 0.37 MPa and a polymerization temperature of 50° C. Dehydrated normal hexane was supplied as a solvent at 40 L/hour. As the catalyst, the solid catalytic component [A] (1.1 mmol/hour in terms of Ti atoms) and triisobutyl aluminum (20 mmol/hour) as a co-catalyst mixed at 50° C. in advance were adjusted to 45° C., and then the mixture was added to the polymerization system at a rate at which the solid catalytic component [A] was 0.08 g/hr. The catalyst was added intermittently by performing continuous addition for 3 minutes and then stopping the addition for 1 minute. Hydrogen was used as a molecular weight modifier and supplied so that the gas phase molar concentration (hydrogen/(ethylene+hydrogen)) of hydrogen with respect to the sum of ethylene and hydrogen was 22.6 mol %. The polyethylene produced in a polymerizer 1 had a viscosity-average molecular weight My of $348 \times 10^4$ and a slurry concentration of 20%.

The polymer slurry solution in the polymerizer reactor at the first stage was guided into a flash drum with an internal volume of 300 liters at a pressure of 0.04 MPa, to separate unreacted ethylene and hydrogen, and then introduced into a vessel-type 300-L polymerization reactor at the second stage as in Example 1 with a slurry pump. Hexane was introduced into the slurry pump at a rate of 95 liters/h. Triethyl aluminum was supplied at 47 mmol/h under the conditions of a temperature of 83° C. and a pressure of 0.58 MPa in the polymerization reactor at the second stage, ethylene and 5.2 mol % of 1-butene with respect to the ethylene were introduced therein, to polymerize the low-molecular weight component so that the ratio of the mass of the high-molecular weight component produced in the polymerization reactor at the second stage with respect to the sum of the mass of the high-molecular weight component produced in the polymerization reactor at the first stage and the mass of the low-molecular weight component produced in the polymerization reactor at the second stage (the mass of the high-molecular weight component produced in the polymerization reactor at the second stage/(the mass of the high-molecular weight component produced in the polymerization reactor at the first stage+the mass of the low-molecular weight component produced in the polymerization reactor at the second stage) was 0.40. Further, the slurry concentration at the second stage was 32%.

Then, the polymerization slurry was continuously sent to a centrifuge, so that the level of the polymerization reactor was kept constant, to separate the polymer and other components such as the solvent.

The polyethylene powder separated was introduced into a dryer and treated in the same manner as in Example 1. A polyethylene powder with a viscosity-average molecular weight of $125 \times 10^4$ g/mol and a content of comonomers of 0.44 mol % was obtained. Table 1 shows the characteristics of the polyethylene powder obtained. The powder crushability was evaluated using Comparative Example 1 described later as a comparison target.

The porous sintered body of Example 4 was obtained by the same operations as in Example 1.

Example 5

A polyethylene powder of Example 5 with a viscosity-average molecular weight of $150 \times 10^4$ g/mol and a content of comonomers of 0.10 mol % was obtained by the same operations as in Example 4, except that the temperature when adding the catalyst was set to 58° C., the polymerization temperature was set to 78° C., the polymerization pressure was set to 0.62 MPa, 1-butene in an amount of 6.6 mol % and hydrogen in an amount of 81.4 mol % with respect to ethylene were introduced, in the polymerization at the first stage, and the polymerization temperature was set to 78° C., the polymerization pressure was set to 0.29 MPa, and 1-butene was introduced in an amount of 0.9 mol % with respect to ethylene, in the polymerization at the second stage.

The porous sintered body of Example 5 was obtained by the same operations as in Example 1.

Example 6

A polyethylene powder with a viscosity-average molecular weight of $406 \times 10^4$ g/mol was obtained by the same operations as in Example 1, except that ethylene was supplied from the bottom of the polymerizer at one site in the polymerization step.

The porous sintered body of Example 6 was obtained by the same operations as in Example 1.

Example 7

A polyethylene powder with a viscosity-average molecular weight 432×10$^4$ g/mol was obtained by the same operations as in Example 1, except that the solid catalytic component [B] (1.4 mmol/hour in terms of Ti atoms) was used in the polymerization step.

The porous sintered body of Example 7 was obtained by the same operations as in Example 1.

Example 8

A polyethylene powder with a viscosity-average molecular weight of 654×10$^4$ g/mol was obtained by the same operations as in Example 2, except that the catalyst was added at the same temperature as the polymerization temperature to the polymerization system in the polymerization step.

The porous sintered body of Example 8 was obtained by the same operations as in Example 1.

Example 9

A polyethylene powder with a viscosity-average molecular weight of 654×10$^4$ g/mol was obtained by the same operations as in Example 1, except that the addition to the polymerization system was performed at a rate at which the solid catalytic component [A] was 0.10 g/hr in the polymerization step. The slurry concentration was 18%.

The porous sintered body of Example 9 was obtained by the same operations as in Example 1.

Comparative Example 1

A polyethylene powder with a viscosity-average molecular weight of 30×10$^4$ g/mol was obtained by the same operations as in Example 1, except that the temperature when adding the catalyst was set to 63° C., the polymerization temperature was set to 83° C., the polymerization pressure was set to 0.50 MPa, and 20 mol % of hydrogen was added, in the polymerization step.

The porous sintered body of Comparative Example 1 was obtained by the same operations as in Example 1.

Table 2 shows the characteristics of the porous sintered body.

Comparative Example 2

A polyethylene powder with a viscosity-average molecular weight of 100×10$^4$ g/mol and a content of comonomers of 0.73 mol % was obtained by the same operations as in Example 1, except that the temperature when adding the catalyst was set to 55° C., the polymerization temperature was set to 65° C., the polymerization pressure was set to 0.26 MPa, and 1-butene was introduced in an amount of 1.45 mol % with respect to ethylene, in the polymerization step.

The porous sintered body of Comparative Example 2 was obtained by the same operations as in Example 1.

Comparative Example 3

Hexane, ethylene, and a catalyst were continuously supplied into a vessel-type 300-L polymerization reactor provided with a stirrer and a jacket cooling device, to polymerize ethylene at a polymerization pressure of 0.45 MPa and a polymerization temperature of 74° C. Dehydrated normal hexane was supplied as a solvent at 40 L/hour. Ethylene was supplied from the bottom of the polymerizer at one site, so that the polymerization pressure was kept at 0.45 MPa. As the catalyst, the solid catalytic component [A] (1.1 mmol/hour in terms of Ti atoms) and triisobutyl aluminum (20 mmol/hour) as a co-catalyst were added to the polymerization system from separate pipes at a rate at which the solid catalytic component [A] was 0.20 g/hr. The catalyst was continuously added.

The catalytic activity was 69,000 g-PE/g-solid catalytic component [A], and the production rate of polyethylene was 10 kg/hr. The polymerization slurry was continuously withdrawn into a flash drum at a pressure of 0.04 MPa so that the level of the polymerization reactor was kept constant, to separate unreacted ethylene.

Then, the polymerization slurry was continuously sent to a centrifuge, so that the level of the polymerization reactor was kept constant, to separate the polymer and other components such as the solvent.

The polyethylene powder separated was introduced into a dryer. Drying was carried out for 0.5 hours while blowing nitrogen at 100° C. In this drying step, steam was sprayed on the powder after the polymerization to deactivate the catalyst and the co-catalyst. To the polyethylene powder obtained, was added 500 ppm of calcium stearate (C60, manufactured by DAINICHI CHEMICAL INDUSTRY CO., LTD.), and the mixture was uniformly mixed using a Henschel mixer. Subsequently, the polyethylene powder was passed through a sieve with a mesh opening of 425 μm, and those that did not pass through the sieve were removed, to obtain polyethylene powder. The viscosity-average molecular weight was 419×10$^4$ g/mol. Table 2 shows the characteristics of the polyethylene powder obtained.

The porous sintered body of Comparative Example 3 was obtained by the same operations as in Example 1.

Comparative Example 4

A polyethylene powder with a viscosity-average molecular weight of 410×10$^4$ g/mol was obtained by the same operations as in Comparative Example 3, except that the solid catalytic component [B] (in terms of Ti atoms 1.4 mmol/hour) was used in the polymerization step.

The porous sintered body of Comparative Example 4 was obtained by the same operations as in Example 1.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Average particle diameter | μm | 90 | 63 | 70 | 89 | 119 | 92 | 91 | 65 | 93 |
| Density | % | 928.4 | 924.2 | 919.2 | 915.8 | 913.2 | 928.7 | 928.1 | 924.3 | 928.5 |
| Compressive strength at 10% displacement of particles with a particle diameter of 60 μm | MPa | 4.4 | 4.3 | 3.5 | 2.1 | 2.0 | 4.7 | 4.9 | 4.8 | 2.9 |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Ratio of compressive strength at 10% displacement of particles with particle diameter of 60 μm to compressive strength at 10% displacement of particles with particle diameter of 100 μm | — | 1.1 | 0.9 | 1.0 | 0.8 | 0.6 | 1.2 | 1.2 | 1.0 | 1.0 |
| Ratio of compressive strength at 20% displacement of particles with particle diameter of 100 μm to compressive strength at 10% displacement of particles with particle diameter of 100 μm | times | 2.0 | 2.2 | 2.0 | 2.1 | 2.0 | 2.2 | 2.5 | 2.3 | 2.0 |
| Tm1-half width | °C. | 5.2 | 5.5 | 8.2 | 9.0 | 9.1 | 4.9 | 5.0 | 5.7 | 5.2 |
| ΔHm-ΔHc | J/g | 68 | 90 | 56 | 55 | 52 | 69 | 72 | 102 | 69 |
| D90/D10 measured with laser particle size distribution meter | — | 2.3 | 2.6 | 2.5 | 2.9 | 2.8 | 2.7 | 2.9 | 3.3 | 2.2 |
| Total content of Ti and Al | ppm | 3.8 | 4.9 | 3.9 | 2.1 | 2.4 | 3.5 | 5.1 | 4.9 | 2.9 |
| Tensile breaking strength | — | ◎ | ◎ | ◎ | ◎ | ◎ | ○ | ○ | ○ | ◎ |
| Variations in tensile breaking strength and water absorption rate | — | ◎ | ◎ | ◎ | ○ | ○ | ○ | ○ | ○ | ◎ |
| Surface roughness (Ra) improvement rate and air permeability reduction rate before and after pressing | — | ◎ | ◎ | ◎ | ◎ | ◎ | ○ | ○ | ○ | ◎ |
| Variations in air permeability | — | ◎ | ◎ | ◎ | ◎ | ○ | ○ | ○ | ○ | ◎ |
| Powder crushability | — | ◎ | ◎ | ◎ | ◎ | ◎ | ◎ | ○ | ◎ | ◎ |
| Uneven distribution of powder | — | ◎ | ◎ | ○ | ◎ | ○ | ○ | ○ | ○ | ◎ |
| Impact resistance of molded article | — | ○ | ○ | ○ | ◎ | ◎ | ○ | ○ | ○ | ◎ |

TABLE 2

|  |  | Comparative Example 1 | Comparative Example 2 | Comparative Example 3 | Comparative Example 4 |
|---|---|---|---|---|---|
| Average particle diameter | μm | 95 | 92 | 90 | 92 |
| Density | % | 949.6 | 909.3 | 928.1 | 927.9 |
| Compressive strength at 10% displacement of particles with a particle diameter of 60 μm | MPa | 9.1 | 1.9 | 5.1 | 5.3 |
| Ratio of compressive strength at 10% displacement of particles with particle diameter of 60 μm to compressive strength at 10% displacement of particles with particle diameter of 100 μm | — | 1.9 | 1.4 | 1.4 | 1.4 |
| Ratio of compressive strength at 20% displacement of particles with particle diameter of 100 μm to compressive strength at 10% displacement of particles with particle diameter of 100 μm | times | 2.7 | 1.6 | 2.7 | 2.6 |
| Tm1-half width | °C. | 4.9 | 10.1 | 4.6 | 4.7 |
| ΔHm-ΔHc | J/g | 13 | 39 | 46 | 46 |
| D90/D10 measured with laser particle size distribution meter | — | 2.1 | 3.1 | 3.2 | 3.5 |
| Total content of Ti and Al | ppm | 3.9 | 9.5 | 11.0 | 13.1 |
| Tensile breaking strength | — | X | X | X | X |
| Variations in tensile breaking strength and water absorption rate | — | X | X | X | X |
| Surface roughness (Ra) improvement rate and air permeability reduction rate before and after pressing | — | X | X | X | X |
| Variations in air permeability | — | X | X | X | X |
| Powder crushability | — | X | X | X | X |
| Uneven distribution of powder | — | X | X | X | X |
| Impact resistance of molded article | — | X | X | X | X |

Further, the measured values of the compressive strengths of particles (five particles) selected at random in each of Examples and Comparative Examples were almost the same.

The polyethylene powder of the present invention contained a particle having a predetermined compressive strength and could suppress the reduction in air permeability even after compression processing by pressing for improving the surface roughness of the porous sintered body.

Further, a porous sintered body with very little variations in characteristics depending on the location of the porous sintered body could be obtained.

Furthermore, a molded article with improved fusion power of powder particles to each other and excellent impact resistance could be obtained.

As described above, the polyethylene powder of the present invention has a peculiar compressive strength and excellent workability due to ease of handling and could provide a molded article and a porous sintered body having excellent uniformity and excellent impact resistance by using the polyethylene powder.

This application is based on Japanese Patent Application No. 2019-193077, filed on Oct. 23, 2019, which is incorporated herein by reference in its entirety.

INDUSTRIAL APPLICABILITY

The polyethylene powder of the present invention has an industrial applicability as a material for molded articles in the form of a microporous membrane, fibers, a sheet, or a block, or porous sintered bodies.

The invention claimed is:

1. A polyethylene powder having a density of 910 kg/m$^3$ or more and less than 935 kg/m$^3$ and an average particle diameter of 50 μm or more and less than 140 μm, wherein
the polyethylene powder comprises a particle having a particle diameter of 60 μm and a particle having a particle diameter of 100 μm,
a compressive strength at 10% displacement of the particle having a particle diameter of 60 μm is 2.0 MPa or more and less than 5.0 MPa, and
the compressive strength at 10% displacement of the particle having a particle diameter of 60 μm is 0.5 times or more and less than 1.3 times a compressive strength at 10% displacement of the particle having a particle diameter of 100 μm.

2. The polyethylene powder according to claim 1, wherein a compressive strength at 20% displacement of the particle having the particle diameter of 100 μm is 1.8 times or more and less than 2.4 times the compressive strength at 10% displacement of the particle having the particle diameter of 100 μm.

3. The polyethylene powder according to claim 1, having a Tm1-half width, as measured with a differential scanning calorimeter (DSC), of 5.0° C. or more and less than 10.0° C.

4. The polyethylene powder according to claim 1, having a difference (ΔHm−ΔHc) between a melting calorie (ΔHm) and a crystallization calorie (ΔHc), as measured with a differential scanning calorimeter (DSC), of 50 J/g or more and less than 100 J/g.

5. The polyethylene powder according to claim 1, having a ratio D90/D10, as measured with a laser particle size distribution meter, of 2.0 or more and less than 3.0.

6. The polyethylene powder according to claim 1, having a total content of Al and Ti of 1 ppm or more and 10 ppm or less.

7. A molded article of the polyethylene powder according to claim 1.

8. The molded article according to claim 7, being a porous sintered body.

* * * * *